United States Patent
Liao (10) Patent No.: US 9,849,902 B1
(45) Date of Patent: Dec. 26, 2017

(54) BABY STROLLERS

(71) Applicant: UNIQUE PRODUCT & DESIGN CO., LTD., Tainan (TW)

(72) Inventor: Tsoung-Yong Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 0 days.

(21) Appl. No.: 15/699,206

(22) Filed: Sep. 8, 2017

Related U.S. Application Data (63) Continuation of application No. 15/374,757, filed on Dec. 9, 2016.

(30) Foreign Application Priority Data

Dec. 17, 2015 (TW) .............................. 104220299 U (51) Int. Cl.
*B62B 7/10* (2006.01)
*B62B 7/08* (2006.01)
*B62B 9/20* (2006.01)
*B62B 7/06* (2006.01)

(52) U.S. Cl.
CPC .............. *B62B 7/08* (2013.01); *B62B 7/064* (2013.01); *B62B 9/20* (2013.01); *B60Y 2200/83* (2013.01); *B62B 2205/04* (2013.01); *B62B 2205/12* (2013.01); *B62B 2301/04* (2013.01)

(58) Field of Classification Search
CPC ............ B62B 7/068; B62B 7/062; B62B 7/10
USPC ......................................... 280/642, 647, 650
See application file for complete search history.

(56) References Cited

U.S. PATENT DOCUMENTS

| | | | | |
|---|---|---|---|---|
| 5,558,357 A | * | 9/1996 | Wang | B62B 7/068 280/647 |
| 9,004,505 B1 | * | 4/2015 | Wu | B62B 3/022 280/38 |
| 2006/0214395 A1 | * | 9/2006 | Ageneau | B62B 7/06 280/642 |
| 2006/0267303 A1 | * | 11/2006 | Golias | B62B 3/02 280/47.34 |
| 2007/0090628 A1 | * | 4/2007 | Golias | B62B 3/12 280/642 |
| 2007/0246916 A1 | * | 10/2007 | Hou | B62B 7/086 280/642 |
| 2008/0054601 A1 | * | 3/2008 | Li | B62B 7/08 280/642 |
| 2008/0211206 A1 | * | 9/2008 | Thorne | B62B 7/068 280/650 |
| 2008/0224450 A1 | * | 9/2008 | Van der Vegt | B62B 7/068 280/642 |
| 2009/0014985 A1 | * | 1/2009 | Huang | B62B 7/068 280/647 |

(Continued)

*Primary Examiner* — Jeffrey J Restifo
(74) *Attorney, Agent, or Firm* — Wang Law Firm, Inc.

(57) ABSTRACT

Provided herein is a baby stroller, which has expanded mode or folded mode, including a lower frame, a slide block, a pull rod set, a rear wheel link rod, a rear wheel frame, an upper arm set, a link rod set, a connection rod set, the first handle rod set, the second handle rod set, and a front wheel frame. Through the slide block and the interaction between each component to concurrently actuate the upper arm set, the first handle rod set, and the second handle rod set, the baby stroller can be easily folded to minimize it occupying space for easier stowing and transporting.

14 Claims, 5 Drawing Sheets

(56) References Cited

U.S. PATENT DOCUMENTS

| | | | |
|---|---|---|---|
| 2012/0086187 A1* | 4/2012 | Daley | B62B 7/062 |
| | | | 280/642 |
| 2013/0093165 A1* | 4/2013 | Liao | B62B 3/02 |
| | | | 280/651 |
| 2014/0339038 A1* | 11/2014 | Welker | B62B 3/02 |
| | | | 190/18 A |
| 2016/0144879 A1* | 5/2016 | Storm | B62B 7/083 |
| | | | 280/650 |
| 2017/0072982 A1* | 3/2017 | Thorne | B62B 7/068 |

\* cited by examiner

BABY STROLLERS

CROSS-REFERENCE TO RELATED APPLICATION

This application is a continuation of prior application Ser. No. 15/374,757, filed on Dec. 9, 2016, which claims priority from Taiwan Patent Application No. 104220299, filed on Dec. 17, 2015 in the Taiwan Intellectual Property Office, the contents of which are hereby incorporated by reference in its entirety for all purposes.

BACKGROUND OF THE INVENTION

1. Field of the Invention

The present invention relates to a baby stroller, and particularly relates to a baby stroller having components coupled to be actuated interactively, such that the frames of the baby stroller may be folded concurrently.

2. Description of the Related Art

Having colorful lifestyles, modern people still need to go out with their babies if they can't find a babysitter. Therefore, a baby stroller is always necessary for parents to carry a baby outside and to ease parents' loading.

However, aside from the moments with babies inside, a baby stroller has to be carried from time to time. At these moments, the function to fold a baby stroller is required for easier transportation. To fold a baby stroller, joints are used conventionally and, in some application, components have to be disassembled. Therefore, a structure of a baby stroller that may be easily folded without disassembling any component may provide further convenience.

SUMMARY OF THE INVENTION

In view of the issues of the aforementioned conventional techniques, the purpose of the present invention is to provide a baby stroller, of which the slide block and the couplings between components may reduce the occupying space of the baby stroller for easier transportation.

Based on the purpose, the present invention provides a baby stroller, which has an expanded mode and a folded mode, includes a lower arm, a slide block, a pull rod set, a rear wheel link rod, a rear wheel frame, an upper arm set, a link rod set, a connection rod set, the first handle rod set, the second handle rod set, and a front wheel frame. One end of the lower arm is disposed with a connection part, and the slide block is disposed on the lower arm, wherein the slide block slides along the lower arm forward and backward. One end of the pull rod set is pivotally connected to the slide block, and one end of the rear wheel frame is connected with the connection part and the other end of the rear wheel frame is connected with at least one rear wheel, wherein the other end of the pull rod set is connected to a position between two ends of the real wheel frame. One end of the upper arm set is pivotally connected to the connection part and one end of the link rod set is pivotally connected to the terminal of the upper arm set. The other end of the link rod set is pivotally connected to the slide block. One end of the connection rod set is fixedly connected to the other end of the upper arm set. One end of the first handle rod set is pivotally connected to the other end of the connection rod set and the other end of the first handle rod set is pivotally connected to the joint set. One end of the second handle rod set is pivotally connected to the joint set, and the front wheel frame is disposed on the other end of the lower arm. The other end of the second handle rod set is pivotally connected to the front wheel frame. The front wheel frame is disposed with at least one front wheel. The slide block is adjacent to the connection part in expanded mode and is adjacent to the front wheel frame in the folded mode. The first handle rod set and the second handle rod set are superposed one another in the folded mode. The angle between the upper arm set and the lower arm is greater in the expanded mode than in the folded mode. The angle between the rear wheel frame and the lower arm is greater in the expanded mode than in folded mode. The upper arm set, the first handle rod set, and the second handle rod set are actuated concurrently while switching between the expanded mode and the folded mode.

Preferably, the upper arm set may be rotated toward the front wheel frame by an external force and actuate the link rod set to push the slide block to slide in the direction toward the front wheel frame during switching from the expanded mode to the folded mode, and the upper arm set may be rotated toward the rear wheel frame by another external force and actuate the link rod set to pull the slide block to slide in the direction toward the connection part during switching from the folded mode to the expanded mode.

Preferably, the upper arm set may rotate about the joint with the connection part toward the front wheel frame during switching from the expanded mode to the folded mode, and the upper arm set may rotate about the joint with the connection part toward the rear wheel frame during switching from the folded mode to the expanded mode.

Preferably, the first handle rod set may rotate about the joint set toward the second handle rod set and the joint set may move towards the connection part during switching from the expanded mode to the folded mode, and the first handle rod set may rotate about the joint set away from the second handle rod set and the joint set may move away from the connection part during switching from the folded mode to the expanded mode.

Preferably, the slide block may slide in the direction toward the front wheel frame to pull the pull rod set and the pull rod set may actuate the rear wheel frame to rotate about the pivotal joint between the rear wheel frame and the connection part toward the lower arm and the rear wheel connected to the rear wheel frame may also be actuated to move in the direction toward the lower arm during switching from the expanded mode to the folded mode, and the slide block may slide in the direction toward the connection part to push the pull rod set and the pull rod set may actuate the rear wheel frame to rotate about the pivotal joint between the rear wheel frame and the connection part away from the lower arm and the rear wheel connected to the rear wheel frame may also be actuated to move in the direction away from the lower arm during switching from the folded mode to the expanded mode.

Preferably, the baby stroller may further include two fixation rods, one of which is disposed between the end of the connection rod set and one end of another connection rod set, and the other of which is disposed between the other end of the connection rod set and the other end of the other connection rod set.

Preferably, the end of the upper arm set that connects the connection rod set is disposed with a handle.

Based on the purpose, the present invention also provides a baby stroller, which has an expanded mode and a folded mode, includes a lower arm, a slide block, a pull rod set, a rear wheel link rod, a rear wheel frame, an upper arm set, a link rod set, a connection rod set, the first handle rod set, the second handle rod set, and a front wheel frame. One end of the lower arm is disposed with a connection part, and the slide block is disposed on the lower arm, wherein the slide block slides along the lower arm forward and backward. One end of the pull rod set is pivotally connected to the slide block, and one end of the rear wheel frame is connected with the connection part and the other end of the rear wheel frame is connected with at least one rear wheel, wherein the other end of the pull rod set is connected to a position between two ends of the real wheel frame. One end of the upper arm set is pivotally connected to the connection part and one end of the link rod set is pivotally connected to the terminal of the upper arm set. The other end of the link rod set is pivotally connected to the slide block. One end of the connection rod set is pivotally connected to the other end of the upper arm set. One end of the first handle rod set is pivotally connected to the other end of the connection rod set and the other end of the first handle rod set is pivotally connected to the joint set. One end of the second handle rod set is pivotally connected to the joint set, and the front wheel frame is disposed on the other end of the lower arm. The other end of the second handle rod set is pivotally connected to the front wheel frame. The front wheel frame is disposed with at least one front wheel. The slide block is adjacent to the connection part in expanded mode and is adjacent to the front wheel frame in the folded mode. The first handle rod set and the second handle rod set are superposed one another in the folded mode. The angle between the upper arm set and the lower arm is greater in the expanded mode than in the folded mode. The angle between the rear wheel frame and the lower arm is greater in the expanded mode than in folded mode. The upper arm set, the first handle rod set, and the second handle rod set are actuated concurrently while switching between the expanded mode and the folded mode.

Based on the description above, through the slide block and the couplings between each component to concurrently actuate the upper arm set, the first handle rod set, and the second handle rod set, the baby stroller may be easily folded to decrease it occupying space for easier stowing and transporting.

DESCRIPTION OF THE PREFERRED EMBODIMENTS

Figure 1:
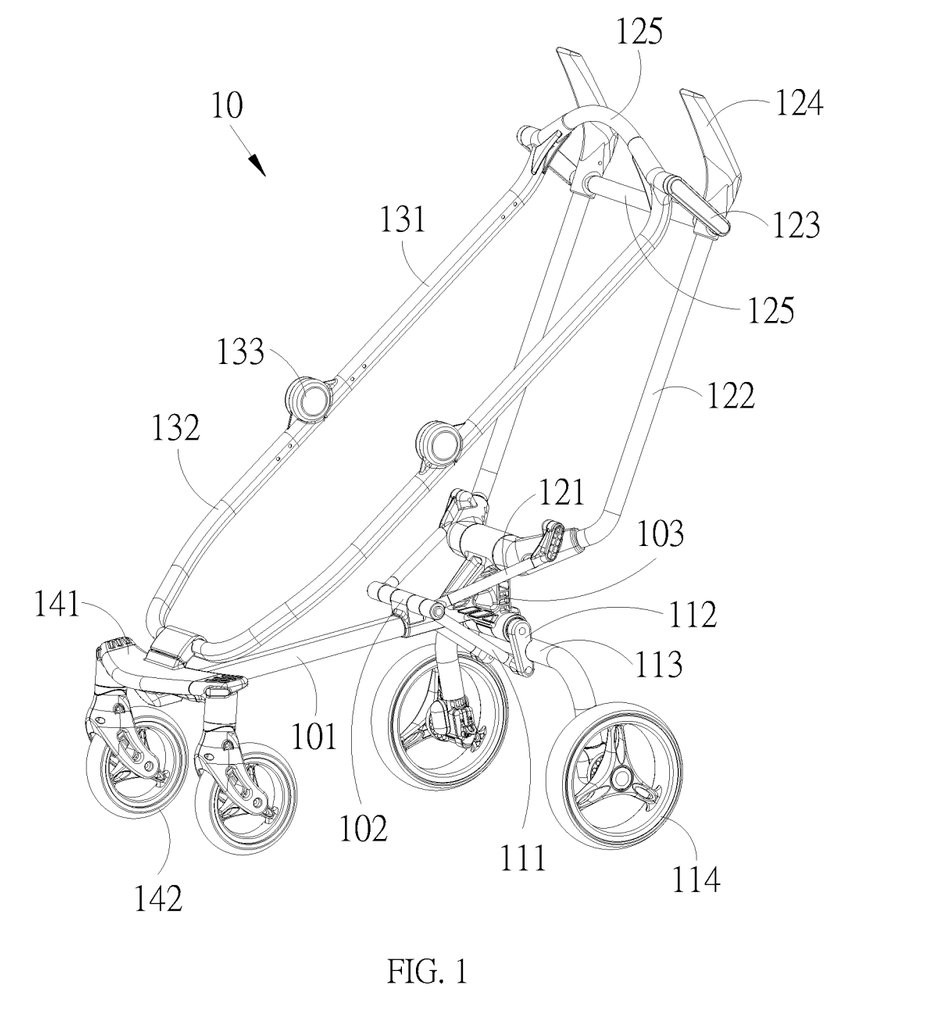
FIG. 1 is a schematic diagram of a baby stroller of the present invention in an expanded mode.
Figure 2:
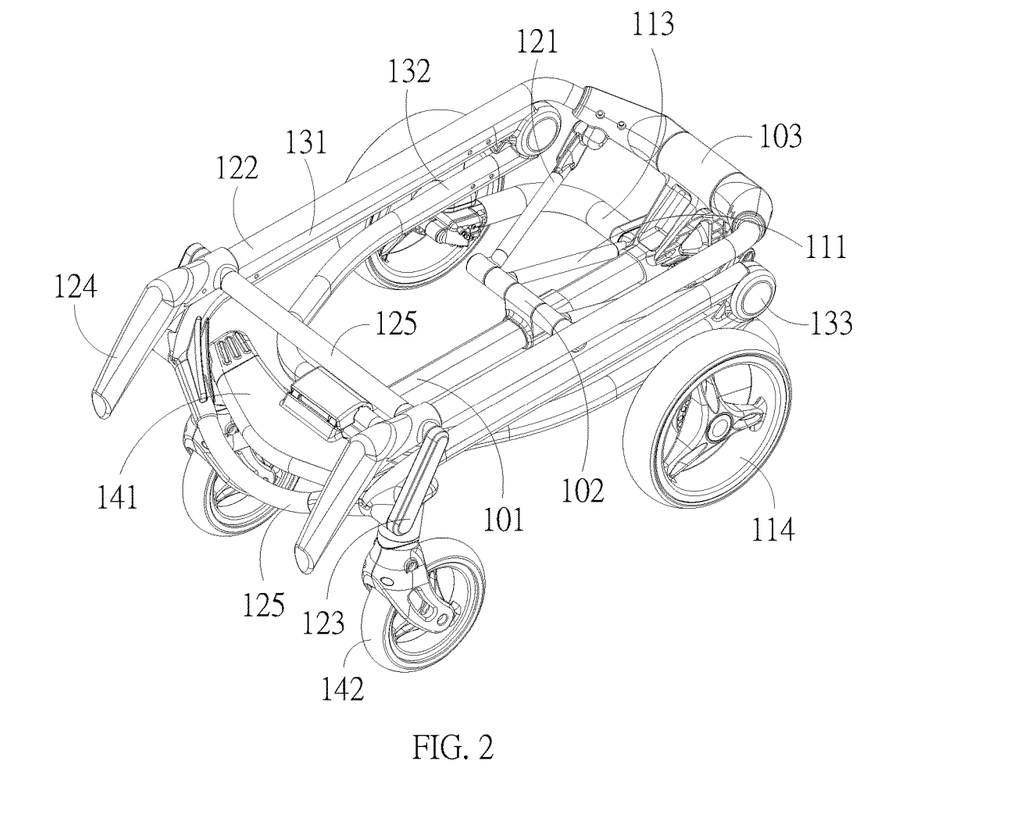
FIG. 2 is a schematic diagram of a baby stroller of the present invention in a folded mode.

Referring to FIGS. 1 and 2, FIG. 1 is a schematic diagram of a baby stroller of the present invention in an expanded mode, and FIG. 2 is a schematic diagram of a baby stroller of the present invention in a folded mode. As shown in the figures, the baby stroller 10 of the present invention has two operation modes, the expanded mode and the folded mode, and includes a lower arm 101, a slide block 102, a pull rod set 111, a rear wheel frame 113, an upper arm set 122, a link rod set 121, a connection rod set 123, the first handle rod set 131, the second handle rod set 132, and a front wheel frame 141.

In the first embodiment of the present invention, one end of the lower arm 101 is disposed with a connection part 103, and the other end of the lower arm 101 is disposed with a front wheel frame 141. The slide block 102 is disposed on the lower arm 101 and may slide along the lower arm 101 forward and backward. One ends of the pull rod set 111 are pivotally connected to both sides of the slide block 102. The rear wheel frame 113 includes two rear wheel link rods 112. One end of the rear wheel frame 113 is connected to the connection part 103. More precisely, one ends of the rear wheel link rods 112 are pivotally connected to either side of the connection part 103. The other end of the pull rod set 111 is connected to the position between two ends of the real wheel frame 113, which means the other ends of two rear wheel link rods 112 are pivotally connected to the other ends of the pull rod set 111 respectively. In the expanded mode, the location of the joint between the rear wheel link rod 112 and the pull rod set 111 is below the joint between the rear wheel link rod 112 and the connection part 103. In the folded mode, the joint between the rear wheel link rod 112 and the pull rod set 111 moves closer to the lower arm 101. Therefore, the rear wheel frame 113 gets closer to the lower arm 101 in the folded mode. Furthermore, the other end of the rear wheel frame 113 is connected to at least one rear wheel 114.

One end of the upper arm set 122 is connected to the connection part 103. One ends of the link rod set 121 are pivotally connected to the upper arm set 122 respectively, and the location of the pivotal connection is adjacent to the pivotal joint between the upper arm set 122 and the connection part 103. The other end of the link rod set 121 is connected to the slide block 102. In other words, the upper arm set 122 is coupled with the slide block 102 through the link rod set 121, and therefore, the upper arm set 122 and the slide block 102 are actuated by one another.

One end of the connection rod set 123 is firmly connected to the other end of the upper arm set 122. One end of the first handle rod set 131 is pivotally connected to the other end of the connection rod set 123, and the other end of the first handle rod set 131 is pivotally connected to the joint set 133. One end of the second handle rod set 132 is also pivotally connected to the joint set 133. In other words, the first handle rod set 131 and the second handle rod set 132 are coupled through the joint set 133. The other end of the second handle rod set 132 is pivotally connected to the front wheel frame 141. The front wheel frame 141 is disposed with at least one front wheel 142.

The operation of each component in expanded mode and folded mode will be described hereinafter. The location of the slide block 102 is adjacent to the connection part 103 in the expanded mode and adjacent to the front wheel frame 141 in the folded mode. The first handle rod set 131 and the second handle rod set 132 are linearly aligned in the expanded mode and are superposed with one another in the folded mode. In other words, the joint between first handle rod set 131 and the connection rod set 123 to the joint between second handle rod set 132 and the front wheel frame 141 is in linear configuration in the expanded mode, and, while switching to the folded mode, the first handle rod set 131 is rotated about the joint set 133 and superposed on the second handle rod set 132. The angle between the upper arm set 122 and the lower arm 101 is greater in the expanded mode than in the folded mode. In other words, to switch to the folded mode, the upper arm set 122 rotates about the joint with the connection part 103 and moves forward to get closer to the lower arm 101, which therefore decreases the angle therebetween. The angle between the rear wheel frame 113 and the lower arm 101 is greater in the expanded mode than in the folded mode. While switching from the expanded mode to the folded mode, the rear wheel frame 113 moves upwards to get closer to the lower arm 101, which decreases the angle between the rear wheel frame 113 and the lower arm 101.

As aforementioned, the baby stroller 10 of the present invention has its configuration fixed in the expanded mode to meet the usage requirement, and each component of the baby stroller moves to its folded position in the folded mode for easier stowing and transporting.

Figure 3:
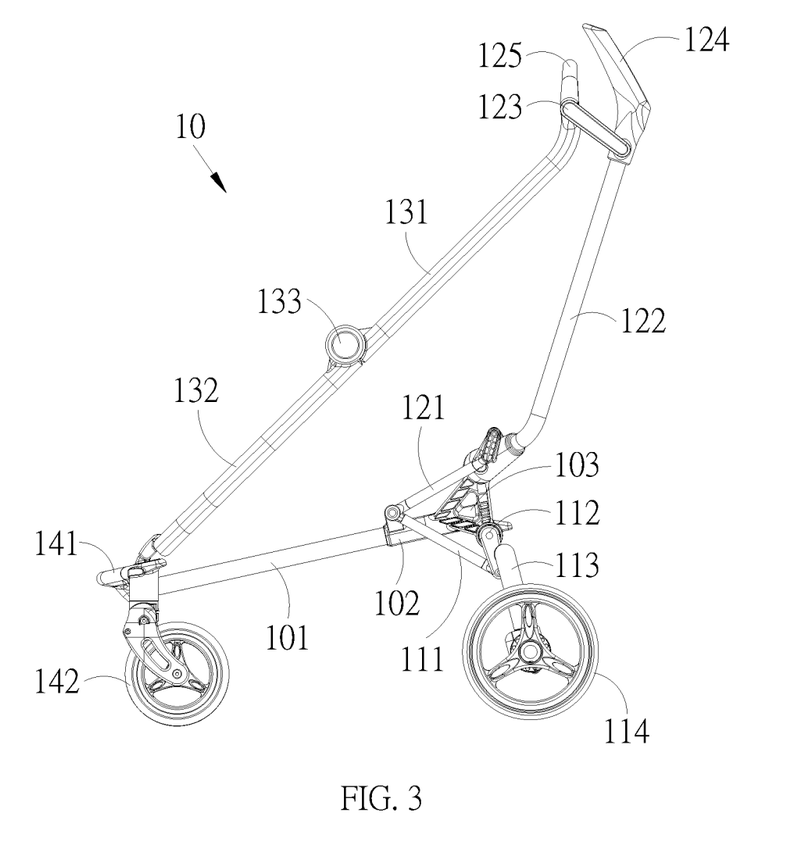
FIGS. 3-5 are schematic diagrams showing a procedure of a baby stroller of the present invention transforming from an expanded mode to a folded mode.
Figure 4:
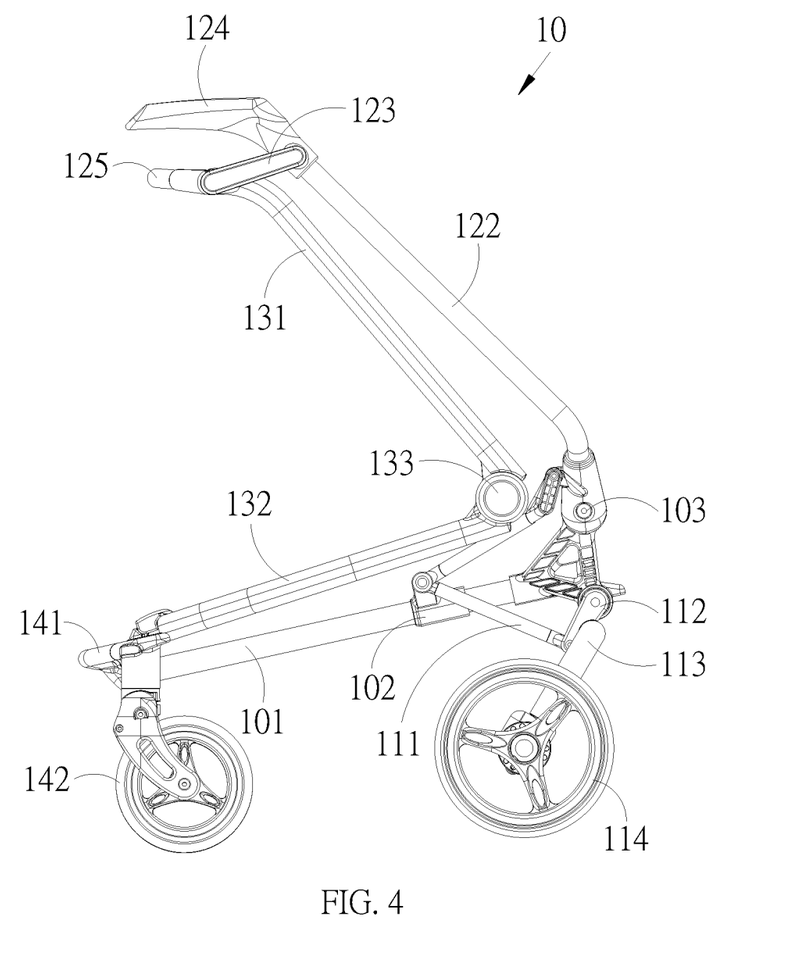
Figure 5:
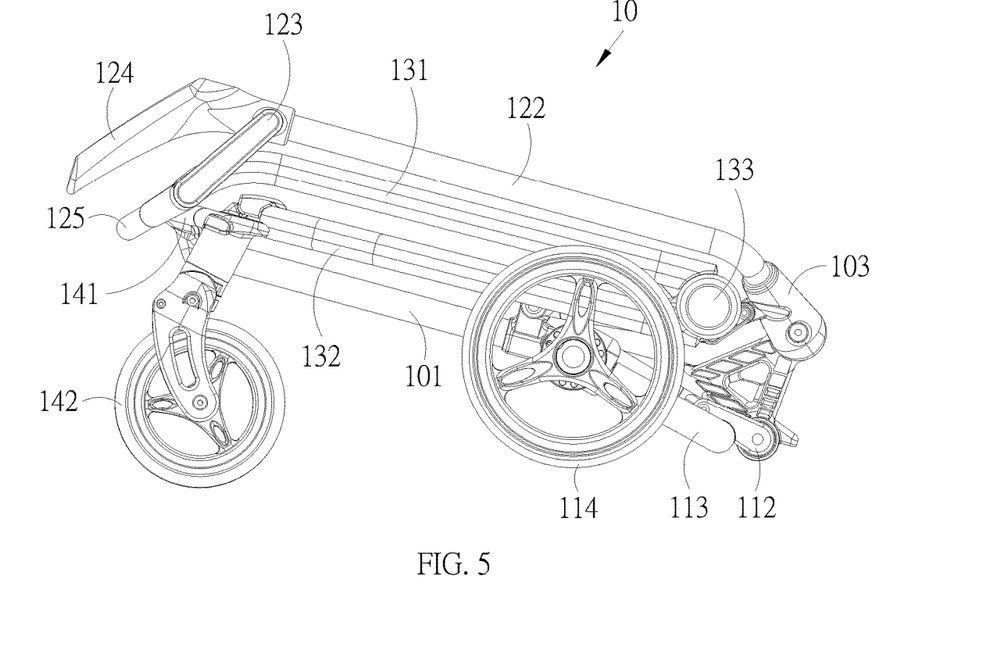

Referring to FIGS. 3-5, they are schematic diagrams showing a procedure of a baby stroller of the present invention transforming from an expanded mode to a folded mode. As shown in the figures, to switch from the expanded mode to the folded mode, an external force is exerted on the upper arm set 122 to rotate it in the direction toward the front wheel frame 141. The movement of the upper arm set 122 actuates the link rod set 121 to push the slide block 102 to slide toward the front wheel frame 141. In other words, a user may force the upper arm set 122 to rotate it in the direction toward the front wheel frame 141 and, consequently, the upper arm set 122 actuates the pivotally connected link rod set 121 to move. The movement of the link rod set 121 pushes the slide block 102 to slide toward the front wheel frame 141.

To switch from the folded mode to the expanded mode, the upper arm set 122 may be rotated toward the rear wheel frame 113 by another external force. The movement of the upper arm set 122 actuates the link rod set 121 to pull the slide block 102 to slide toward the connection part 103. In other words, a user may pull the upper arm set 122 upward to rotate it toward the rear wheel frame 113 and, consequently, the upper arm set 122 actuates the pivotally connected link rod set 121 to move. The movement of the link rod set 121 pulls the slide block 102 to slide toward the connection part 103.

Moreover, while switching from the expanded mode to the folded mode, the upper arm set 122 of the baby stroller 10 of the present invention is moved by an external force in the direction toward the front wheel frame 141 through its rotation about the joint with the connection part 103. On the other hand, while switching from the folded mode to the expanded mode, the upper arm set 122 of the baby stroller 10 is also rotated about the joint with the connection part 103 but to the direction toward the rear wheel frame 113.

Moreover, while switching from the expanded mode to the folded mode, the first handle rod set 131 is rotated about the joint set 133 toward the second handle rod set 132, and the joint set 133 moves toward the connection part 103. In other words, the upper arm set 122 is rotated toward the front wheel frame 141 by an external force and, consequently, the rotation of the upper arm set 122 actuates the connected connection rod set 123 to move. The movement of the connection rod set 123 pushes the pivotally connected first handle rod set 131 to rotate about the joint set 133 toward the second handle rod set 132. More specifically, the first handle rod set 131 and the second handle rod set 132 get closer to one another through the rotation about the joint set 133 and, concurrently, move closer to the lower arm 101. Also, during the movement of the first handle rod set 131 and the second handle rod set 132, the joint set 133 correspondingly moves downward and gets closer to the connection part 103.

While switching from the folded mode to the expanded mode, the first handle rod set 131 may rotate about the joint set 133 in the direction away from the second handle rod set 132, and the joint set 133 moves away from the connection part 103. In other words, while the upper arm set 122 is rotated in the direction toward the rear wheel frame 133 by another external force, the upper arm set 122 actuates the connected connection rod set 123 to move. Consequently, the movement of the connection rod set 123 pulls the pivotally connected first handle rod set 131, such that the first handle rod set 131 rotates about the joint set 133 in the direction away from the second handle rod set 132. More specifically, the first handle rod set 131 and the second handle rod set 132 rotate away from one another about the joint set 133 and, concurrently, move upward away from the lower arm 101. Also, during the movement of the first handle rod set 131 and the second handle rod set 132, the joint set 133 correspondingly moves upward away from the connection part 103.

Preferably, the joint set 133 may include a locking structure (not shown in the figures) to lock the rotation of the joint set 133 and, as a result, the first handle rod set 131 and the second handle rod set 132 may be fixed in the linearly aligned position. This may prevent the structure from loosening during the usage of the baby stroller 10. To fold the baby stroller of the present invention, a user may unlock the locking structure and rotate the first handle rod set 131 and the second handle rod set 132 about the joint set 133 until the two are superposed with one another.

Furthermore, while switching from the expanded mode to the folded mode, the slide block 102 may slide in the direction toward the front wheel frame 141 to pull the pull rod set 111. The movement of the pull rod set 111 consequently actuates the rear wheel frame 113 to rotate about the joint with the connection part 103 in the direction toward the lower arm 101. More specifically, while the slide block 102 slides in the direction toward the front wheel frame 141, the pivotally connected pull rod set 111 with the slide block 102 is also pulled by the slide block 102. As a result, the rear wheel link rod 112 pivotally connected to the pull rod set 111 is actuated to rotate forward and upward about the joint with the connection part 103, such that the angle between the pull rod set 111 and the rear wheel link rod 112 increases and, therefore, the rear wheel 113 connected to the rear wheel frame 113 is also actuated to move in the direction toward the lower arm 101.

While switching from the folded mode to the expanded mode, the slide block 102 may slide in the direction toward the connection part 103 to push the pull rod set 111. The movement of the pull rod set 111 consequently actuates the rear wheel frame 113 to rotate about the joint with the connection part 103 in the direction away from the lower arm 101. In this case, while the slide block 102 slides in the direction toward the connection part 103, the pull rod set 111 pivotally connected to the slide block 102 is also pushed, which actuates the rear wheel link rod 112 pivotally connected to the pull rod set 111 to rotate downward about the joint with the connection part 103, such that the angle between the pull rod set 111 and the rear wheel link rod 112 decreases and the rear wheel 114 connected to the rear wheel frame 113 is therefore carried to move in the direction away from the lower arm 101.

The mechanism of the mode switching is briefed hereinafter. While switching the baby stroller 10 of the present invention from the expanded mode to the folded mode, a user may push the upper arm set 122 to cause the linear aligned the first handle rod set 131 and the second handle rod set 132 to bend around the joint set 133. The first handle rod set 131 and the second handle rod set 132 then are superposed with one another and move closer to the lower arm 101. Meanwhile, the slide block 102 is pushed to slide in the direction toward the front wheel frame 141. The movement of the slide block 102 actuates the rear wheel frame 113 to move forward and upward and get closer to the lower arm 101. In this way, the baby stroller 10 of the present invention is collapsed to its folded mode, as shown in FIG. 5, for saving its occupying space.

With the aforementioned mechanism and the coupling structure of the slide block 102 and each component, the baby stroller 10 of the present invention may switch between the expanded mode and the folded mode. To fold it up, it only needs a simple push on the upper arm set 122 without disassembling any component. Also, the application of the slide block 102 reduces the need of bending any component, such that, based on his needs, a user may easily expand or fold the baby stroller 10 with the simplified procedure.

The baby stroller 10 of the present invention may further include two fixation rods 125, one of which is disposed between two ends of the connection rod sets 123 and the other end of which is disposed between the other two ends of connection rod sets 123. With these fixation rods 125, the structure of the baby stroller 10 may be reinforced for better safety, and the actuation of the upper arm set 122 for switching between folded and expanded mode is also easier.

Furthermore, the ends of the upper arm set 122 that are connected to the connection rod set 123 may also dispose with handles 124. The handle 124 facilitates the control of the baby stroller 10. In expanded mode, the handle 124 provides the user a position to push the baby stroller 10. The handle 124 also provides the user a position to effectively exert forces on the baby stroller 10 to switch it to the folded mode.

It should be noted that the additional soft structures for a baby to sit in may also be included in the baby stroller 10 of the present invention. Also, sun shading components and object carrying structures may also be included in the baby stroller 10 to fulfill the needs.

In the second embodiment of the present invention, the connection rod set 123 is pivotally connected to the upper arm set 122. Opposite to the first embodiment that the connection rod set 123 is fixedly connected to the upper arm set 122, the connection rod set 123 may be pivotally connected to the upper arm set 122 based on the actuation design, such that the ability to rotate at the joint provides flexibility during switching the baby stroller 10 between the expanded mode and the folded mode.

As aforementioned, through the coupling between each component, the baby stroller of the present invention may be folded without disassembling any component. The only force exerting on the upper arm set may actuate the first handle rod set, the second handle rod set, and the lower arm to move concurrently, which provides easy folding procedure to reduce the occupying space of the baby stroller for easier transportation.

The description above is only for the purpose of illustration but not restriction. Without departing from the spirit of the present application, any equivalent modification or alteration should be considered as falling within the protection scope of the appended claims.

What is claimed is:

1. A baby stroller with an expanded mode and a folded mode, comprising:
   a lower arm, one end of which is disposed with a connection part, a slide block being disposed on the lower arm, wherein the slide block slides along the lower arm;
   a pull rod set, one end of which is pivotally connected to the slide block;
   a rear wheel frame, one end of which is connected to the connection part and the other end of which is connected to at least one rear wheel, wherein the other end of the pull rod set is connected to a position between both of the ends of the real wheel frame;
   an upper arm set, one end of which is pivotally connected to the connection part;
   a link rod set, one end of which is pivotally connected to a terminal of the upper arm set and the other end of which is pivotally connected to the slide block;
   a first handle rod set, one end of which is disposed adjacently to the other end of the upper arm set and the other end of which is pivotally connected to a joint set;
   a second handle rod set, one end of which is pivotally connected to the joint set; and
   a front wheel frame, which is disposed on the other end of the lower arm, wherein the other end of the second handle rod set is pivotally connected to the front wheel frame and at least one front wheel is disposed on the front wheel frame; wherein the slide block is adjacent to the connection part in the expanded mode, and the slide block is adjacent to the front wheel frame in the folded mode, and the first handle rod set and the second handle rod set are superposed one another in the folded mode, and an angle between the upper arm set and the lower arm is greater in the expanded mode than in the folded mode, and an angle between the rear wheel frame and the lower arm is greater in the expanded mode than in the folded mode, the upper arm set, the first handle rod set, and the second handle rod set are actuated concurrently while switching between the expanded mode and the folded mode.

2. The baby stroller of claim 1, wherein the upper arm set is rotated toward the front wheel frame by an external force and actuates the link rod set to push the slide block to slide in the direction toward the front wheel frame during switching from the expanded mode to the folded mode, and the upper arm set is rotated toward the rear wheel frame by an other external force and actuates the link rod set to pull the slide block to slide in the direction toward the connection part during switching from the folded mode to the expanded mode.

3. The baby stroller of claim 1, wherein the upper arm set rotates about a joint with the connection part toward the front wheel frame during switching from the expanded mode to the folded mode, and the upper arm set rotates about the joint with the connection part toward the rear wheel frame during switching from the folded mode to the expanded mode.

4. The baby stroller of claim 1, wherein the first handle rod set rotates about the joint set toward the second handle rod set and the joint set moves towards the connection part during switching from the expanded mode to the folded mode, and the first handle rod set rotates about the joint set away from the second handle rod set and the joint set moves away from the connection part during switching from the folded mode to the expanded mode.

5. The baby stroller of claim 1, wherein the slide block slides in the direction toward the front wheel frame to pull the pull rod set and the pull rod set actuates the rear wheel frame to rotate about a pivotal joint between the rear wheel frame and the connection part toward the lower arm and the at least one rear wheel connected to the rear wheel frame is actuated to move in the direction toward the lower arm during switching from the expanded mode to the folded mode, and the slide block slides in the direction toward the connection part to push the pull rod set and the pull rod set actuates the rear wheel frame to rotate about the pivotal joint between the rear wheel frame and the connection part away from the lower arm and the at least one rear wheel connected to the rear wheel frame is actuated to move in the direction away from the lower arm during switching from the folded mode to the expanded mode.

6. The baby stroller of claim 1, further comprising at least one fixation rod, the fixation rod is disposed between the end of the first handle rod set and one end of another connection rod set.

7. The baby stroller of claim 1, wherein the other end of the upper arm set is disposed with a handle.

8. A baby stroller with an expanded mode and a folded mode, comprising:
   a lower arm, one end of which is disposed with a connection part and on which is disposed with a slide block, wherein the slide block slide along the lower arm;
   a pull rod set, one end of which is pivotally connected to the slide block;
   a rear wheel frame, one end of which is connected to the connection part and the other end of which is connected to at least one rear wheel, wherein the other end of the pull rod set is connected to a position between both of the ends of the real wheel frame;
   an upper arm set, one end of which is pivotally connected to the connection part;
   a link rod set, one end of which is pivotally connected to the terminal of the upper arm set and the other end of which is pivotally connected to the slide block;
   a first handle rod set, one end of which and the other end of the upper arm set are connected to each other through a connection element and the other end of which is pivotally connected to a joint set;
   a second handle rod set, one end of which is pivotally connected to the joint set; and
   a front wheel frame, which is disposed on the other end of the lower arm, wherein the other end of the second handle rod set is pivotally connected to the front wheel frame and at least one front wheel is disposed on the front wheel frame; wherein the slide block is adjacent to the connection part in the expanded mode, and the slide block is adjacent to the front wheel frame in the folded mode, and the first handle rod set and the second handle rod set are superposed one another in the folded mode, and an angle between the upper arm set and the lower arm is greater in the expanded mode than in the folded mode, and an angle between the rear wheel frame and the lower arm is greater in the expanded mode than in the folded mode, the upper arm set, the first handle rod set, and the second handle rod set are actuated concurrently while switching between the expanded mode and the folded mode.

9. The baby stroller of claim 8, wherein the upper arm set is rotated toward the front wheel frame by an external force and actuates the link rod set to push the slide block to slide in the direction toward the front wheel frame during switching from the expanded mode to the folded mode, and the upper arm set is rotated toward the rear wheel frame by an other external force and actuates the link rod set to pull the slide block to slide in the direction toward the connection part during switching from the folded mode to the expanded mode.

10. The baby stroller of claim 8, wherein the upper arm set rotates about a joint with the connection part toward the front wheel frame during switching from the expanded mode to the folded mode, and the upper arm set rotates about the joint with the connection part toward the rear wheel frame during switching from the folded mode to the expanded mode.

11. The baby stroller of claim 8, wherein the first handle rod set rotates about the joint set toward the second handle rod set and the joint set moves towards the connection part during switching from the expanded mode to the folded mode, and the first handle rod set rotates about the joint set away from the second handle rod set and the joint set moves away from the connection part during switching from the folded mode to the expanded mode.

12. The baby stroller of claim 8, wherein the slide block slides in the direction toward the front wheel frame to pull the pull rod set and the pull rod set actuates the rear wheel frame to rotate about a pivotal joint between the rear wheel frame and the connection part toward the lower arm and the at least one rear wheel connected to the rear wheel frame is actuated to move in the direction toward the lower arm during switching from the expanded mode to the folded mode, and the slide block slides in the direction toward the connection part to push the pull rod set and the pull rod set actuates the rear wheel frame to rotate about the pivotal joint between the rear wheel frame and the connection part away from the lower arm and the at least one rear wheel connected to the rear wheel frame is actuated to move in the direction away from the lower arm during switching from the folded mode to the expanded mode.

13. The baby stroller of claim 8, further comprising at least one fixation rod, the fixation rod is disposed between the end of the first handle rod set and one end of another connection rod set.

14. The baby stroller of claim 8, wherein the other end of the upper arm set is disposed with a handle.

* * * * *